US007089220B2

(12) United States Patent
Fromherz et al.

(10) Patent No.: US 7,089,220 B2
(45) Date of Patent: Aug. 8, 2006

(54) COMPLEXITY-DIRECTED COOPERATIVE PROBLEM SOLVING

(75) Inventors: Markus P. J. Fromherz, Palo Alto, CA (US); Yi Shang, Columbia, MO (US); Lara S. Crawford, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 521 days.

(21) Appl. No.: 10/602,189

(22) Filed: Jun. 24, 2003

(65) Prior Publication Data

US 2004/0267679 A1    Dec. 30, 2004

(51) Int. Cl.
*G06N 5/00*    (2006.01)
(52) U.S. Cl. .............................. 706/45; 706/19; 706/60
(58) Field of Classification Search ................ 356/604; 706/45, 19, 60; 707/3; 370/216
See application file for complete search history.

(56) References Cited

U.S. PATENT DOCUMENTS

| | | | | |
|---|---|---|---|---|
| 5,175,601 A | * | 12/1992 | Fitts ............................ | 356/604 |
| 5,870,731 A | | 2/1999 | Trif et al. ...................... | 706/52 |
| 6,088,690 A | | 7/2000 | Gounares et al. .............. | 706/13 |
| 6,144,923 A | | 11/2000 | Grosse .......................... | 702/56 |
| 6,144,953 A | * | 11/2000 | Sorrells et al. ................ | 706/60 |
| 6,665,262 B1 | * | 12/2003 | Lindskog et al. ............. | 370/216 |
| 6,865,562 B1 | * | 3/2005 | Fromherz et al. .............. | 706/14 |
| 6,886,010 B1 | * | 4/2005 | Kostoff .......................... | 707/3 |
| 6,912,515 B1 | * | 6/2005 | Jackson et al. ................ | 706/19 |

OTHER PUBLICATIONS

U.S. Appl. No. 09/874,167, filed Jun. 4, 2001, Markus P.J. Fromherz et al.
U.S. Appl. No. 09/874,552, filed Jun. 4, 2001, Warren B. Jackson et al.
M.J.P. Fromherz, T. Hogg, W.B. Jackson, Y. Shang, Modular Robot Control and Continuous Cosntraint Satisfaction, Proc. IJCAI-01 Workshop on Modeling and solving Problems with Constraints, Seattle, WA, 2001, p. 47-56.
B. Kitts, Regulation of Complex Systems, Proc. 1st Int'l Conf. On Complex Systems, Sep. 1997.

(Continued)

*Primary Examiner*—Wilbert L. Starks, Jr.
(74) *Attorney, Agent, or Firm*—Linda M. Robb

(57) ABSTRACT

A cooperative solving method for controlling a plurality of constraint problem solvers identifies complexity criteria, which provide direction for selecting and for transitioning between constraint problem solvers. The method includes randomly selecting a test point and determining whether the test point satisfies a first complexity criterion. A first constraint problem solver is selected, and an alternate test point is identified by the first solver if the complexity criterion has not been satisfied. If the alternate test point is a problem solution, it is transmitted to the system. If the alternate test point is not a problem solution or if the original randomly-selected test point satisfies the complexity criterion, a second constraint solver selects a new test point. If the new test point is a problem solution, it is transmitted to the system; if the new test point is not a solution, the cooperative solver is restarted.

30 Claims, 10 Drawing Sheets

OTHER PUBLICATIONS

O.C. Martin, Combining Simulated Annealing with Local Search Heuristics, G. Laporte and I. Osman, editors, Metaheuristics in Combinatorial Optimization, p. 57-75, Annuals of Operations Research vol. 63, 1996.

M.J. Murphy, E.L. Baker, Global Local Optimizer, http://www.llnl.gov/glo/09glo.html, LLNL unclassified code #960007, Lawrence Livermore National Laboratory, Livermore CA, Nov. 1995.

Y. Shang, M.P.J. Fromherz, T. Hogg, W.B. Jackson, Complexity of Continuous, 3-SAT-like Constraint Satisfaction Problems, Proc. IJCAI-01 Workshop on Stochastic Search Algorithms, Seattle, WAS, 2001, p. 49-54.

* cited by examiner

COMPLEXITY-DIRECTED COOPERATIVE PROBLEM SOLVING

This work was funded in part by the Defense Advanced Research Projects Agency (DARPA), Contract #F33615-01-C-1904. The U.S. Government may have certain rights in this subject matter.

INCORPORATION BY REFERENCE

The following U.S. patent applications are fully incorporated herein by reference: U.S. application Ser. No. 09/874,552, filed Jun. 4, 2001, ("Method and System for Algorithm Synthesis in Problem Solving"); and U.S. application Ser. No. 09/874,167, filed Jun. 4, 2001, ("Adaptive Constraint Problem Solving Method and System").

BACKGROUND

This disclosure relates generally to the field of computerized problem solving and in particular to a system and method for controlling multiple problem solving algorithms for continuous constraint satisfaction.

In certain control system applications, there exists a significant need for systems which can provide satisfactory decisions in critically time-constrained situations for complex systems having subsystems consisting of many networked sensors and actuators, with each subsystem having control, monitoring and fault diagnosis capabilities. Advances in hardware technology, such as inexpensive processors, low-cost micro-electromechanical systems (MEMS) actuators and sensors, and decreasing communication costs, result in systems with unprecedented reconfigurability, flexibility, and robustness. Such applications would benefit from the use of generic problem solvers, such as constraint solvers, to improve fault tolerance and reconfigurability. However, such problem solvers are typically not able to adapt their execution to or even execute within the resource bounds of the applications, such as time and memory limits.

However, most of these applications, such as control applications, pose problems that have exponential complexity, and a single constraint solving algorithm by itself is often not able to guarantee real-time performance and bounded memory use, or find the best result within a time bound, when faced with such problems.

Various forms of meta-heuristics have been proposed to combine global and local search heuristics, for both discrete and continuous optimization problems. For example, genetic algorithms for global search have been proposed using random local search, a conjugate gradient method, and stochastic approximation. GLO (Global Local Optimizer) software uses a genetic method as the global technique and variable metric nonlinear optimization as the local technique. LGO (Lipschitz-Continuous Global Optimizer) integrates several global (adaptive partition and random search based) and local (conjugate directions type) strategies as discussed in Pinter, J. D., "Global Optimization in Action", Kluwer Academic Publishers, 1996. In Kitts, B., "Regulation of Complex Systems", Proc. 1$^{st}$ Conference on Complex Systems, September 1997, Kitts presents an enumerative strategy (uniform random sampling) combined with a greedy strategy (hill-climbing). However, most of these approaches have been applied to unconstrained problems.

Similar work exists for combinatorial problems as well. For example, in Martin, O. C., "Combining Simulated Annealing with Local Search Heuristics", G. Laporte and I. Osman, editors, Metaheuristics in Cominatorial Optimization, pages 57–75. Annual of Operations Research Vol. 63, 1996, a meta-heuristic called "Chained Local Optimization" embeds deterministic local search techniques into simulated annealing for traveling salesman and graph partitioning problems. Genetic algorithms have also been combined with local searches for combinatorial problems, as shown in Muhlenbein, Georges-Schleuter, and Kramer, "Evolution Algorithms in Combinatorial Optimization", Parallel Computing, 7(65), 1988.

There is less work on cooperative solving of continuous constraint satisfaction problems (CSPs). Prior work by the inventors ("Method and System for Algorithm Synthesis in Problem Solving", to Jackson et al., U.S. application Ser. No. 09/874,552, and "Adaptive Constraint Problem Solving Method and System", to Fromherz et al., U.S. application Ser. No. 09/874,167) has been directed to cooperative solvers of various combinations of Adaptive Simulated Annealing, Nelder-Mead algorithm, Sequential Quadratic Programming, and the Interior-Point solving algorithm LOQO. However, none of these methods perform effort allocation for solvers systematically based on complexity analysis, nor do they explicitly take the time bound into account when selecting solvers and solver parameters. Also, none of them learn from on-line performance data to improve solver selection and transitioning between solvers. It would be useful to utilize adaptive strategies for transitioning between solvers for use with complex control applications.

BRIEF SUMMARY

The disclosed embodiments provide examples of improved solutions to the problems noted in the above "background" discussion and the art cited therein. There is shown in these examples an improved cooperative solving method for controlling a plurality of constraint problem solvers within a computerized problem solving system. Complexity criteria, identified for each constraint problem solver, provide direction for selecting a constraint problem solver and for transitioning between constraint problem solvers. The method includes randomly selecting an initial random test point, determining whether the test point satisfies a specified complexity criterion, and basing the selection of a constraint problem solver on this determination. The selected solver identifies an alternate test point, which is tested to determine whether it is a problem solution, which is then returned to the system. If the alternate test point is not a solution, a second constraint solver selects a new test point. If the new test point is a problem solution, it is transmitted to the system; if it is not a problem solution, the cooperative solver is restarted.

There is also shown in these examples an improved cooperative solving system for controlling a plurality of constraint problem solvers within a computerized problem solving system. Complexity criteria, identified for each constraint problem solver, provide direction for selecting a constraint problem solver and for transitioning between constraint problem solvers. The system includes means for randomly selecting an initial random test point, determining whether the test point satisfies a specified complexity criterion, and basing the selection of a constraint problem solver on this determination. The selected solver identifies an alternate test point, which is tested to determine whether it is a problem solution, which is then returned to the system. If the alternate test point is not a solution, a second constraint solver selects a new test point. If the new test point is a problem solution, it is transmitted to the system; if it is not a problem solution, the cooperative solver is restarted.

There is also shown in these examples an article of manufacture in the form of a computer usable medium having computer readable program code embodied in said medium which, causes the computer to perform method steps for an improved cooperative solving method for controlling a plurality of constraint problem solvers within a computerized problem solving system. Complexity criteria, identified for each constraint problem solver, provide direction for selecting a constraint problem solver and for transitioning between constraint problem solvers. The method includes randomly selecting an initial random test point, determining whether the test point satisfies a specified complexity criterion, and basing the selection of a constraint problem solver on this determination. The selected solver identifies an alternate test point, which is tested to determine whether it is a problem solution, which is then returned to the system. If the alternate test point is not a solution, a second constraint solver selects a new test point. If the new test point is a problem solution, it is transmitted to the system; if it is not a problem solution, the cooperative solver is restarted.

BRIEF DESCRIPTION OF THE DRAWINGS

The foregoing and other features of the method and system for complexity-directed cooperative problem solving will be apparent and easily understood from a further reading of the specification, claims and by reference to the accompanying drawings in which:

DETAILED DESCRIPTION

Figure 1:
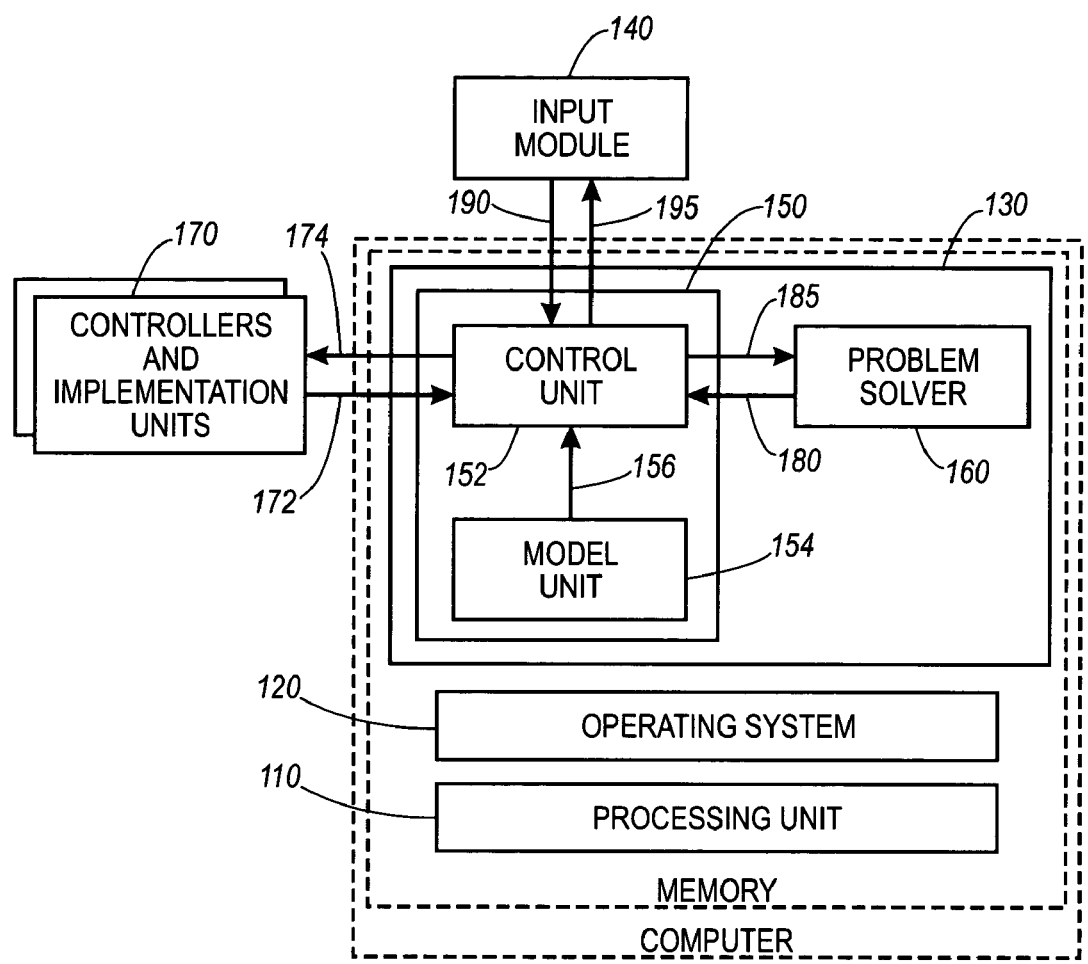
FIG. 1 is a schematic of a representative system incorporating an adaptive constraint solver capable of supporting complexity-directed cooperative problem solving.

Different individual constraint solvers and optimizing algorithms can have very different complexity behavior on the same constraint satisfaction or constrained optimization problems. By combining multiple solvers, it is possible to find better solutions within the same time bound, or find solutions of the same quality more quickly. For example, while global solvers are good at searching an entire search space, they do not converge to an optimum well, something for which local solvers are very effective. Consequently, combining global and local solvers in series combines the strengths of each: the global solver moves to a promising region, in which the local solver quickly finds the local optimum. More than two algorithms can also be combined.

A plain cooperative solver consists of one or more iterations of the following sequence of executions: random (re)start, global solver, local solver. One can analyze the characteristics of the current point (variable assignments) found when the algorithm switches from the global to the local solver. For constraint satisfaction problems, two such characteristics are the penalty value (the "amount of constraint violation") of that point, and the probability that the local solver can find a solution when starting from that point. The penalty value is an indication for how close the point found by the global solver is to the solution (to a region where all constraints are satisfied). Intuitively, the global solver will assist the local solver by bringing it closer to solution regions, but it must work increasingly harder to achieve that.

For constraint satisfaction problems, the goal is largely finding a feasible solution within a time bound or as quickly as possible. For constrained optimization problems, the goal becomes finding a best possible solution, i.e., a feasible point with the smallest objective value, within a time bound or as fast as possible. Combining different types of solvers, such as ones searching in different spaces, can lead to significant performance improvement. For example, in a cooperative solver consisting of an unconstrained and a constrained optimizer, the unconstrained optimizer may be run first for some time to minimize a penalty function, which is a sum of the objective and constraint violations. The point found by this optimizer is then used as the starting point of the constrained optimizer. Tests have shown that the cooperative solver is much faster than the constrained optimizer for weakly constrained problems. In addition, the objective values of the solutions found by the cooperative solver are much better than those found by the constrained optimizer. For problems with a certain constraint ratio, the best of the three solvers may be selected based on the time bound.

Various computing environments may incorporate complexity-directed cooperative solving. The following discussion is intended to provide a brief, general description of suitable computing environments in which the cooperative solving method and system may be implemented. Although not required, the method and system will be described in the general context of computer-executable instructions, such as program modules, being executed by a networked computer. Generally, program modules include routines, programs, objects, components, data structures, etc. that perform particular tasks or implement particular abstract data types. Moreover, those skilled in the art will appreciate that the method and system may be practiced with other computer system configurations, including hand-held devices, multiprocessor systems, microprocessor-based or programmable consumer electronics, networked PCs, minicomputers, mainframe computers, and the like. The method and system may also be practiced in distributed computing environments where tasks are performed by remote processing devices that are linked through a communications network. In a distributed computing environment, program modules may be located in both local and remote memory storage devices.

Although the complexity-directed cooperative problem solver described herein is not limited to embedded applications, the following discussion will pertain to embedded systems for purposes of example only. One skilled in the art will appreciate that the adaptive constraint problem solver is useful for many complex control problems, generic software solutions to a wide variety of programming problems, flexible programs that separate the model from its solution, and wherever formulation as constraint problems is natural for expression of domain knowledge. Additionally, it may be practiced in a multitude of computing environments.

FIG. 1 illustrates one example of how complexity-directed problem solving is implemented with selected modules of an embedded computer system that is an integral part of a larger computing system or machine. Embedded systems are used to control, monitor or assist an operation being performed by equipment interfacing with the computer system. Typically, an embedded system is housed on a microprocessor board with Read Only Memory (ROM) for storing the programs and Random Access Memory (RAM) for program execution data. Examples of devices utilizing embedded systems include printers, cameras, watches, microwaves, video cassette recorders, automobiles, engineering tools, process control systems, and office and consumer products. Some embedded systems include an operating system, but many are so specialized that the entire logic can be implemented as a single program. Embedded systems may also be controlled by external software, as in a client/server environment. However, embedded systems present resource constraints, such as less memory and a slower processor, which limit their capabilities. The problem solver described herein is able to operate within these resource constraints and increase the functionality of the system by providing the capability of taking into account a wider array of objectives and constraints for the performance of tasks being directed by the system. It gives the system the flexibility of operating in real time with more complex system constraints than is possible with existing systems.

It will be recognized that a computing environment may include various modules, such as a processing unit, system memory, a system bus coupling various system components to the processing unit, an input/output system, a hard disk drive, an optical disk drive, program modules, program data, monitor, various interfaces, peripheral output devices, and/or networked remote computers. However, for the purpose of clarity, FIG. 1 illustrates only those modules within the computing environment which interact with the complexity-directed cooperative problem solving program. In particular, the cooperative problem solving program resides within a computing module, which includes a processing unit 110, operating system 120, applications module 130 and memory module. The memory module may be comprised of one or more of disk storage, tape storage, magnetic media, non-volatile memory, EPROM memory, EEPROM memory, FLASH memory, DRAM memory, SRAM memory, ROM, CD memory, computer memory, and/or any like memory system or device. Applications module 130 may perform many possible tasks, such as configuration management, coordination (directing the interaction of multiple hardware components), planning, scheduling, predictive observer (monitoring a hardware component, extrapolating future behavior from past behavior, and outputting the predicted behavior), system control, and diagnostics. The embodiments of the applications module described herein are exemplary only and do not limit the function of the applications module to those specific tasks.

In this embodiment, applications module 130 includes controller module 150 and complexity-directed cooperative problem solver program 160. Within controller module 150 resides control unit 152, which communicates with model unit 154 through path 156. Path 156 provides control unit 152 with instructions concerning the constraints, such as hardware constraints, within the system and secondary goals for the task to be performed, for example, conserving energy or maintaining moving parts at a constant velocity. Control unit 152 communicates with input module 140 through input path 190 and output path 195. Input path 190 provides control unit 152 with instructions as to the primary goal or goals of a task to be performed, for example, moving a sheet of paper within a specified time frame or coordinating the movement of vehicles geographically. Output path 195 provides input module 140 with feedback as to an error in the execution of the task, such as when the goal or goals could not be achieved. The error specifies the deviation of the actual state or behavior from the goal state or behavior.

The complexity-directed cooperative problem solver program 160 is interconnected to controller module 150 through control paths 180 and 185. Control path 185 provides complexity-directed cooperative solver program 160 with the goals and constraints to be imposed on the system and information on the current state of the implementation units. Control path 180 provides control unit 152 with the solution for the problem presented. The solution sent on control path 180 is time-critical, i.e., it has to be delivered in a timely manner (for example, once a second or once a millisecond), otherwise control will deteriorate. Control unit 152 is interconnected to various implementation units 170 through sensor path 172 and control path 174. Sensor path 172 provides the controller with information as to the current state of implementation units 170. Control path 174 provides a control signal to implementation units 170 after receipt of the problem solution from adaptive constraint problem solver 160. Additionally, input module 140 may be connected to model unit 154 through an additional input path, not shown, to provide the capability to modify the constraints or secondary goal input from model unit 154 to control unit 152.

Figure 2:
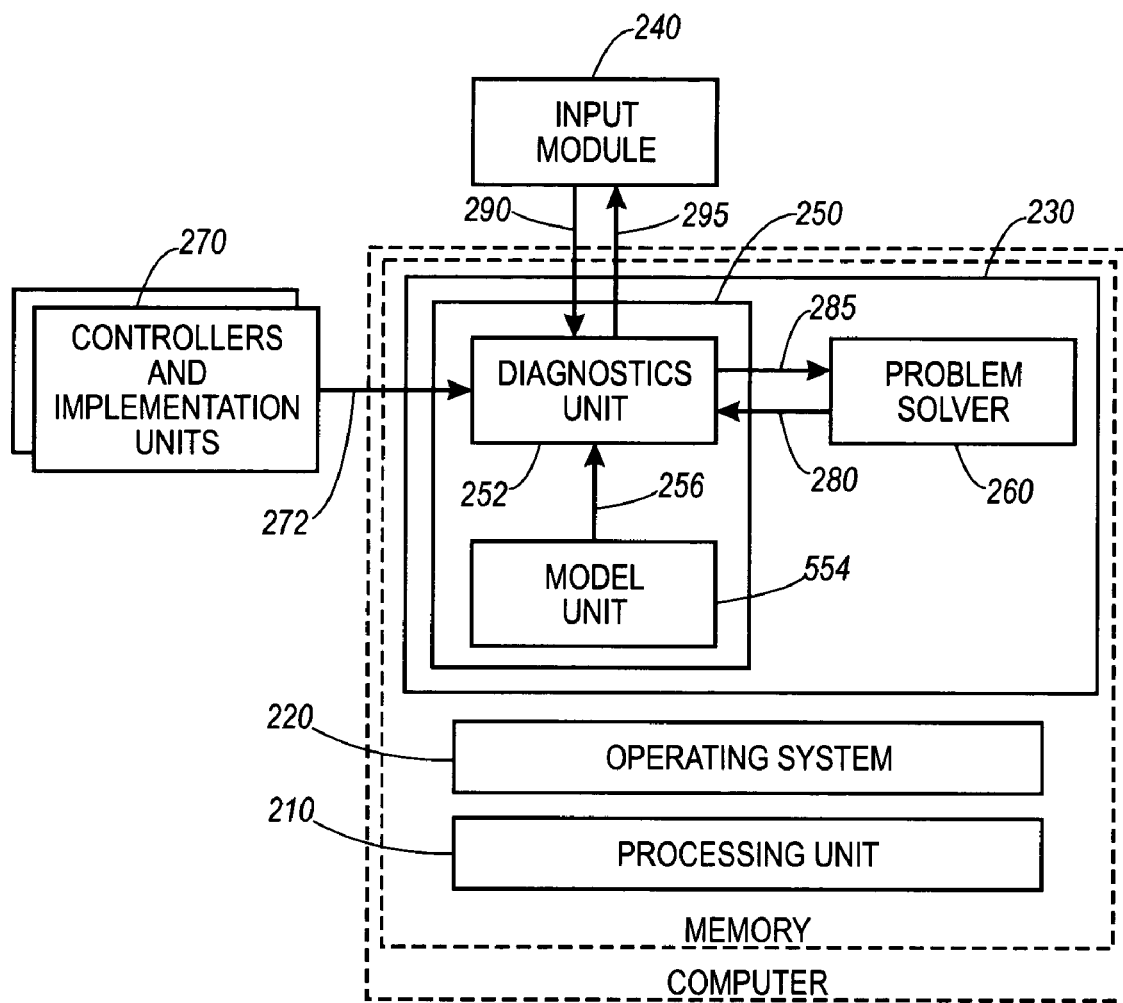
FIG. 2 is a schematic of another representative system incorporating an adaptive constraint solver capable of supporting complexity-directed cooperative problem solving.

Referring now to FIG. 2, there is shown a second example of how the complexity-directed problem solver program interacts with modules of a general purpose computing system. Again, for the purpose of clarity, FIG. 2 illustrates only those modules within the computing environment which interact with the complexity-directed cooperative problem solving program. Other modules such as those described above may be part of the system. The complexity-directed cooperative problem solving program resides within a computing module, which includes a processing unit 210, operating system 220, and applications module 230. In this embodiment, applications module 230 includes diagnostics module 250 and complexity-directed cooperative problem solver program 260. Within diagnostics module 250 resides diagnostics unit 252, which communicates with model unit 254 through path 256. Path 256 provides diagnostics unit 252 with instructions concerning task constraints, such as hardware constraints, within the system and secondary goals for the task to be performed, for example, conserving energy. Diagnostics unit 252 communicates with input module 240 through input path 290 and output path 295. Input path 290 provides diagnostics unit 252 with instructions as to the primary fault or faults to be monitored, for example, deviations in the speed of a wheel driven by a motor from the expected speed (because of slippage). Output path 295 provides input module 240 with feedback as to current system status and its deviation from normal behavior. The complexity-directed cooperative problem solver program 260 is interconnected to diagnostics module 250 through paths 280 and 285. Path 285 provides complexity-directed cooperative problem solver program 260 with the goals and constraints to be imposed on the system and information on the current state of the implementation units. Path 280 provides diagnostics unit 252 with the solution for the problem presented. The solution sent on control path 280 is time-critical, i.e., it has to be delivered in a timely manner (for example, once a second or once a millisecond), otherwise control will deteriorate. Diagnostics unit 252 is interconnected to various implementation units 270 through sensor path 272. Sensor path 272 provides diagnostics unit 252 with information as to the current state of implementation units 270. Because the form and complexity of the problems given to the solver may be quite different from each other, particularly across applications, complexity-directed solving is necessary to enable use of the same generic adaptive solver as applications and problems change.

For the purposes herein, a particular problem P is either a constraint satisfaction problem or a constrained optimization problem to be solved through the use of a collection of solvers C, satisfying a deadline $t_d$ by which a solution has to be produced with a desired solution quality. The solution quality may be defined as appropriate for a problem. Examples include the value of the objective function, the maximum constraint violation, or the value of a penalty function. Each of the solvers is parameterized by control variables, with the control parameters of cooperative solvers including the parameters of each individual solver and the condition of stopping one solver and starting the subsequent one. For example, consider a case in which C contains two solvers: a local solver, A, and a cooperative solver with a global and a local solving part, B, and in which P is a constraint satisfaction problem and $t_d$ is a large number. Based on their empirical complexity graph, if the constraint ratio of P is small, the local solver A will be selected. On the other hand, if the constraint ratio of P is large, then the cooperative solver B will be selected. As the constraint ratio of P increases, B will run its global solving part longer or multiple times before starting its local solving part. For constraint satisfaction problems, the goal is to find a feasible solution or to find a solution with the smallest constraint violation within the time bound $t_d$.

Figure 3:
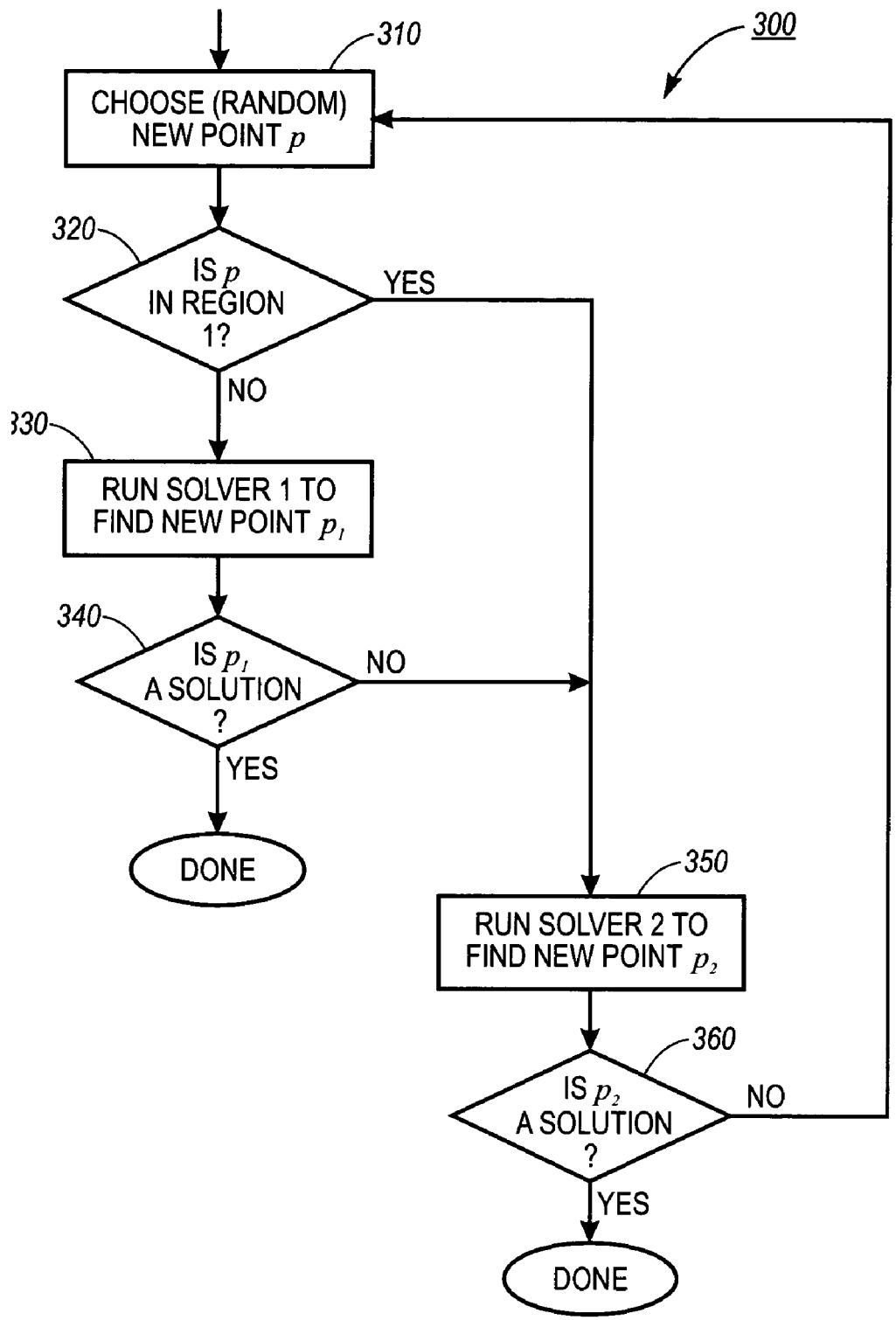
FIG. 3 is a flowchart illustrating an embodiment of solver operation within the complexity-directed solving method.

Turning now to FIG. 3, the flowchart illustrates an embodiment 300 of the complexity-directed cooperative problem solving method. For the purposes of example only, in this embodiment solver 1 is a global solver, while solver 2 is a local solver. In this embodiment a randomly selected test point is determined to be within solution region 1 and the appropriate solver is then run to find a closer solution point. A random solution first test point p is selected at 310 and a determination is made at 320 as to whether p is in region 1. A point is considered to be in region 1 if the constraint ratio (constraint-to-variable ratio) of the problem is less than the local-global crossover, which is the point at which the cooperative solver returns better performance than an individual solver. If point p is located in region 1, solver 2 is run to find a new point $p_2$ at 350, followed by a check at 360 to determine if the new point $p_2$ is a solution. If the new point $p_2$ is a solution, that information is returned to the system. If the new point $p_2$ is not a solution, the method returns to 310 and a new test point is randomly selected.

If first test point p is not located in region 1, then at 330 solver 1 is run to identify a new point $p_1$, which is checked to determine at 340 as to whether the new point $p_1$ is a solution. If the new point $p_1$ is a solution, the information is returned to the system. If the new point $p_1$ is not a solution, the method proceeds to 350 and solver 2 is run to find a new point $p_2$.

Figure 4:
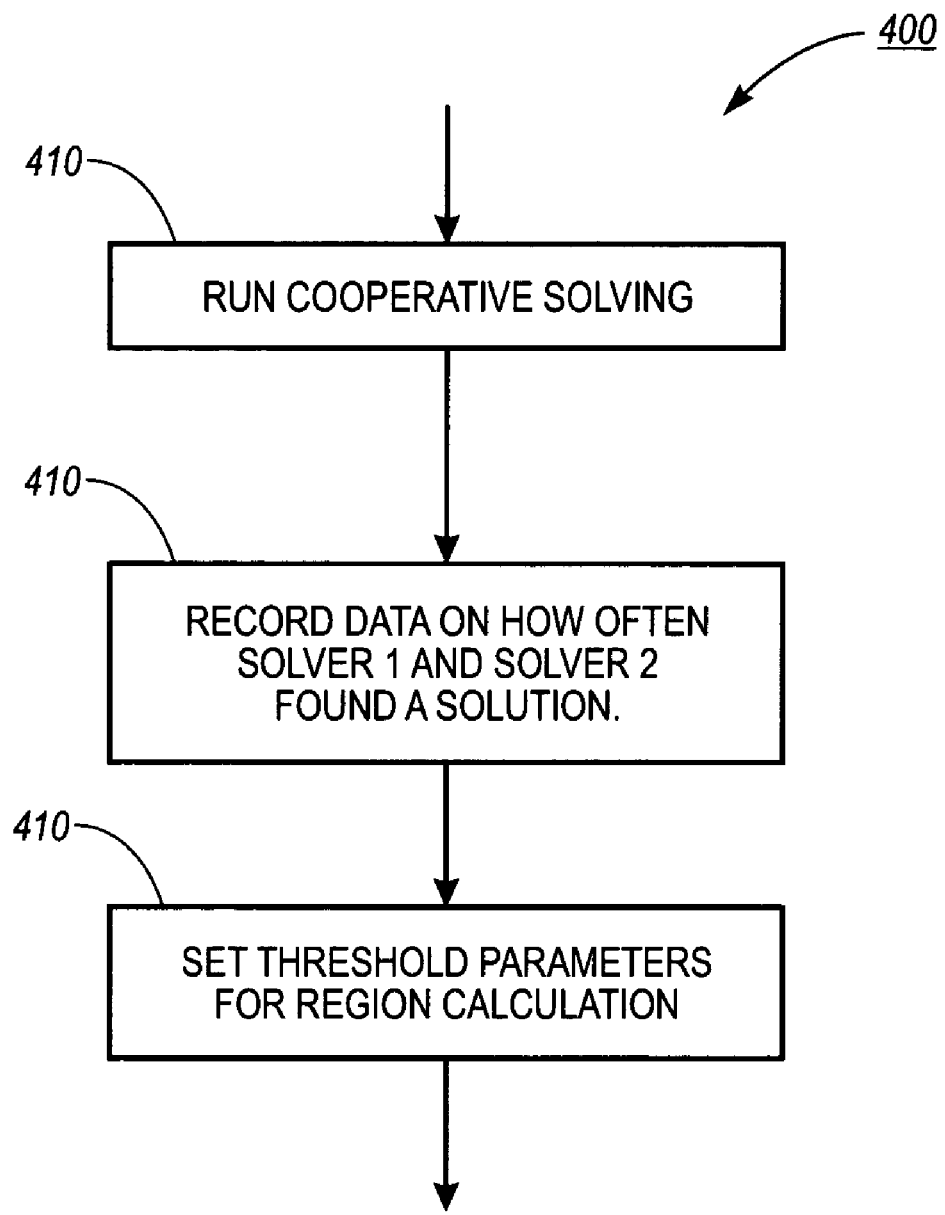
FIG. 4 is a flowchart illustrating an embodiment of the method for utilizing on-line setting of parameters with the cooperative solving method.

Turning now to FIG. 4, the flowchart illustrates one embodiment of the operation of the complexity-directed solver method 400. At 410 the complexity-directed cooperative solver is given a problem, a collection of solvers, and a deadline $t_d$ by which a solution for the problem has to be produced. The problem may be either a constraint satisfaction problem or a constrained optimization problem, while the solvers may include, for example, a local solver and a cooperative solver with a global and a local solving part. The complexity-directed cooperative solver is run until either a solution p is found or time threshold $t_d$ is reached, using at least two solvers. Data is recorded on how often solver 1 and solver 2 found a solution and on how often solver 1 followed by solver 2 found a solution at 420. Threshold parameters for region calculation are set at 430. One exemplary approach to setting threshold parameters is to map the results from the training on an area with a constraint ratio on one axis and the quality of the solution on the other axis. (The constraint ratio is a problem characteristic, specifically the number of constraints divided by the number of variables. The solution quality is a result of solving the problem and is a solver characteristic.) A constraint ratio value, or threshold, may then be determined such that the majority of problems to the left of this value perform better with one kind of solver, while the majority of problems to the right of this value perform better with another kind of solver.

Figure 5:
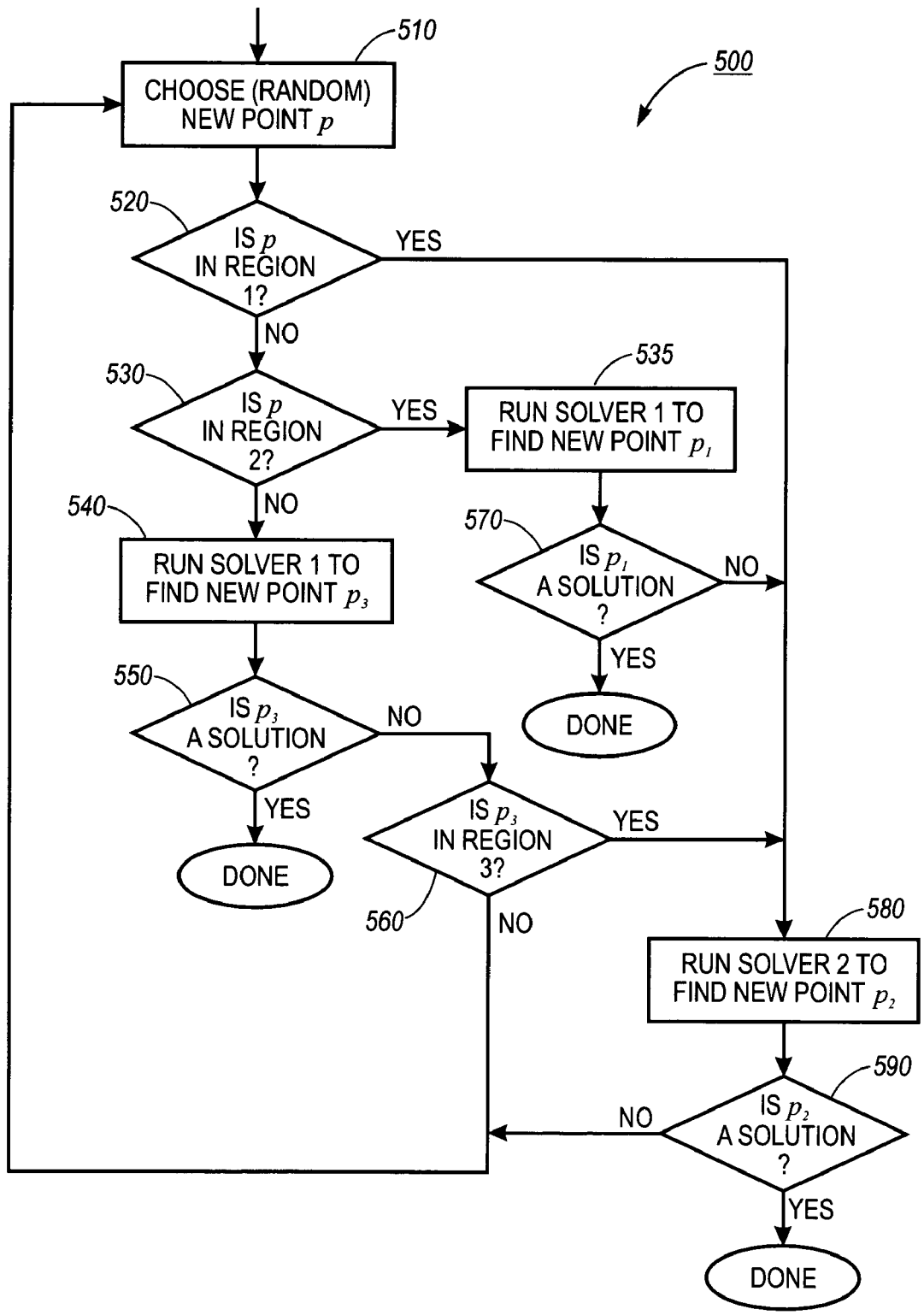
FIG. 5 is a flowchart illustrating an embodiment of the complexity-directed cooperative solving method.

FIG. 5 illustrates in more detail the complexity-directed cooperative solving method 500 described in FIG. 4 at 410. For the purposes of example only, in this embodiment solver 1 may be a global solver, while solver 2 may be a local solver. In this embodiment, a randomly selected test point is determined to be within solution region 1, 2, or 3 and the appropriate solver is then run to find a closer solution point. A random solution test point p is selected at 510 and a determination is made at 520 as to whether test point p is in region 1. A point is considered to be in region 1 if the constraint ratio (constraint-to-variable ratio) of the problem is less than the local-global crossover, which is the point at which the cooperative solver returns better performance than an individual solver. If test point p is located in region 1, solver 2 is run to find a new point $p_2$ at 580, followed by a check at 590 to determine if the new point $p_2$ is a solution. If the new point $p_2$ is a solution, that information is returned to the system. If the new point $p_2$ is not a solution, the method returns to 510 and a new point p is randomly selected.

If point p is not located in region 1, a determination is made at 530 as to whether random test point p is in region 2. A point is considered to be in region 2 if the constraint ratio of the problem is less than the global-local phase transition, which is the point at which one of the cooperative solvers transitions from flat performance to an exponential complexity increase. If point p is located in region 2, then at 535 solver 1 is run to find an alternate point $p_1$, followed by a check at 570 to determine whether alternate point $p_1$ is a solution. If the alternate point $p_1$ is a solution, the information is returned to the system; if the alternate point $p_1$ is not a solution, the system proceeds to 580 and solver 2 is run to find another new point $p_2$.

If p is not in region 2, at 540 solver 1 is run to find a new point $p_3$. At 550, a determination is made as to whether $p_3$ is a solution. If $p_3$ is a solution, the information is returned to the system; if $p_3$ is not a solution, a determination is made at 560 as to whether $p_3$ is in region 3. A point is in region 3 if the penalty function value of the point is greater than the value determined to have a given minimum success probability, which is defined as the probability that the solver can find a solution when starting from that point. If $p_3$ is not in region 3, the method returns to 510 and a new point is randomly selected. If $p_3$ is in region 3, the method proceeds to 580 and solver 2 is run to find a new point $p_2$.

One example of pseudo code for complexity-directed cooperative problem solving presented herein is directed to a constraint satisfaction problem, for which the goal is to find a feasible solution or to find a solution with the smallest constraint violation within the time bound $t_d$. As one skilled in the art would appreciate, other approaches could be utilized, for example, a check could be added for violation of resource constraints. Such alternate approaches are fully contemplated by the specification and scope of the claims herein.

Interrupt the following algorithm when $t_d$ is reached and return the best solution found by then.
    (re)start with any random-sampling method to find new point p;
    if p is in region 1 then
        run local solver to find new point p;
        if p is not a solution then restart else end;
    else if p is in region 2 then
        run global solver to find new point p;
        if p is not a solution then run local solver to find new point p else end;
        if p is not a solution then restart else end;
    else
        run global solver to find new point p;
        if p is a solution then end
        else if p is in region 3 then
            run local solver to find new point p;
            if p is not a solution then restart else end;
        else restart;

where p is a test point and the regions are defined by the following conditions:

1. A point is in region 1 if the constraint ratio of the problem is less than the local-global crossover ($r_c$), which is the crossover ratio at which the cooperative solver delivers better performance than an individual solver.

2. A point is in region 2 if the constraint ratio of the problem is less than the global-local phase transition ($r_p$), which is the ratio at which one of the cooperative solvers transitions from flat performance to an exponential complexity increase.

3. A point is in region 3 if the penalty function value of the point is greater than the success probability value ($p_s$), which is related to the probability that the solver can find a solution when starting from that point.

Figure 6:
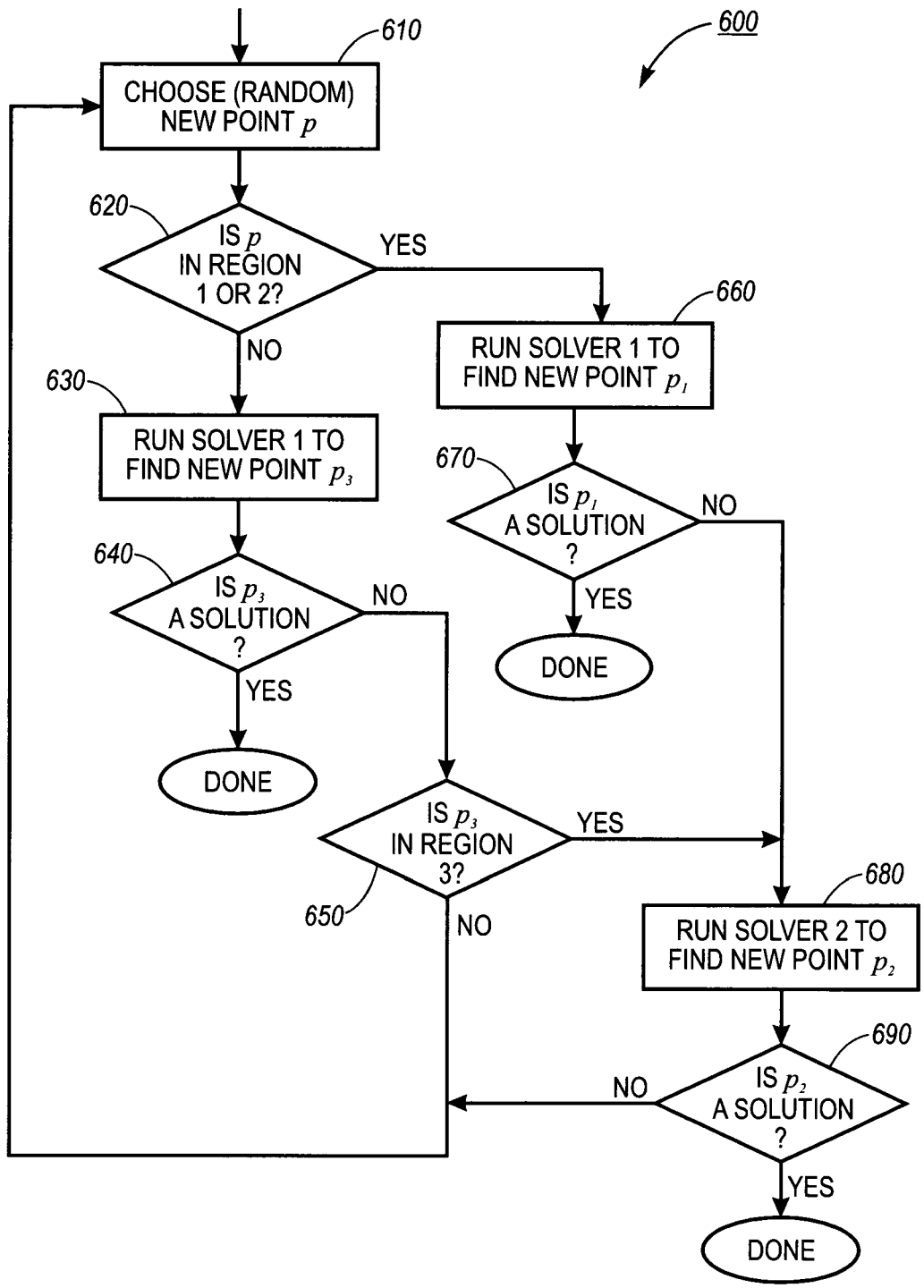
FIG. 6 is a flowchart illustrating an embodiment of the complexity-directed cooperative solving method, utilizing a global solver initially.

Turning now to FIG. 6, there is illustrated another embodiment 600 of the complexity directed cooperative problem solving method. For the purposes of example only, in this embodiment solver 1 is a global solver, while solver 2 is a local solver. In this embodiment, the method operates initially with a global solver. A random solution first test point p is selected at 610 and a determination is made at 620 as to whether p is in either region 1 or region 2. A point is considered to be in region 1 if the constraint ratio (constraint-to-variable ratio) of the problem is less than the local-global crossover, which is the point at which the cooperative solver returns better performance than an individual solver. A point is considered to be in region 2 if the constraint ratio of the problem is less than the global-local phase transition, which is the point at which one of the cooperative solvers transitions from flat performance to an exponential complexity increase. If point p is located in either region 1 or region 2, solver 1 is run to find a new point $p_1$ at 660, followed by a check at 670 to determine if the new point $p_1$ is a solution. If the new point $p_1$ is a solution, that information is returned to the system.

If the new point $p_1$ is not a solution, the system proceeds to 680 and solver 2 is run to find another new point $p_2$, followed by a check at 690 to determine whether new point $p_2$ is a solution. If the new point $p_2$ is a solution, the information is returned to the system; if the new point $p_2$ is not a solution, the method returns to 610 and a new random test point is selected.

If point p is not located in either region 1 or region 2, then at 630 solver 1 is run to identify a new point $p_3$. A determination is made at 640 as to whether the new point $p_3$ is a solution. If the new point $p_3$ is a solution, the information is returned to the system. If the new point $p_3$ is not a solution, a determination is made at 650 as to whether $p_3$ is in region 3. A point is in region 3 if the penalty function value of the point is greater than the value determined to have a given minimum success probability, which is defined as the probability that the solver can find a solution when starting from that point. If $p_3$ is not in region 3, the method returns to 610 and a new point is randomly selected. If $p_3$ is in region 3, the method proceeds to 680 and solver 2 is run to find a new point $p_2$.

Figure 7:
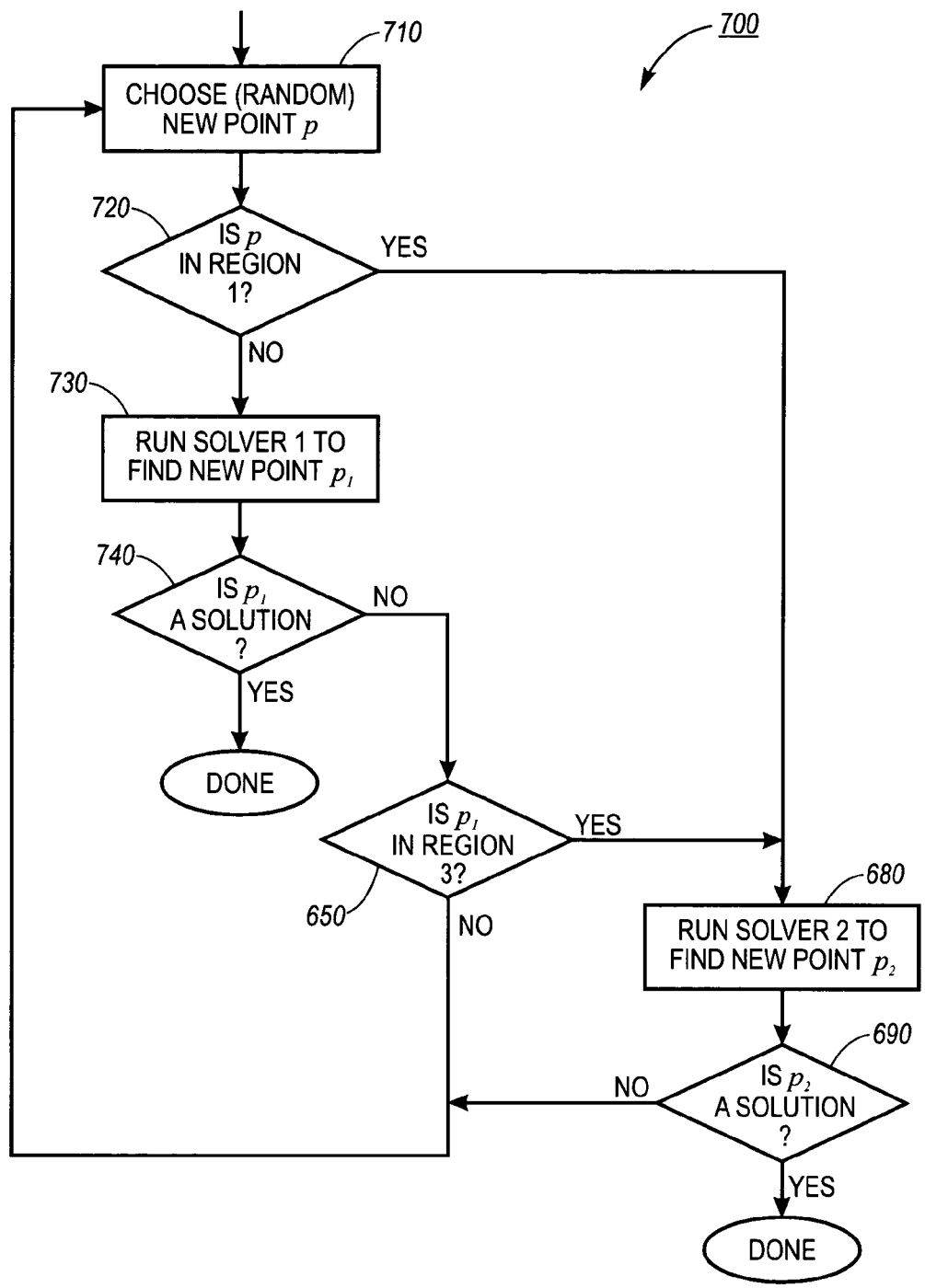
FIG. 7 is a flowchart illustrating a third embodiment of the complexity-directed cooperative solving method, having a penalty function check.

FIG. 7 illustrates another embodiment 700 of the complexity-directed cooperative problem solving method. For the purposes of example only, in this embodiment solver 1 is a global solver, while solver 2 is a local solver. In this embodiment the penalty function is checked for highly constrained problems. A random solution first test point p is selected at 710 and a determination is made at 720 as to whether p is in region 1. A point is considered to be in region 1 if the constraint ratio (constraint-to-variable ratio) of the problem is less than the local-global crossover, which is the point at which the cooperative solver returns better performance than an individual solver. If point p is located in region 1, solver 2 is run to find a new point $p_2$ at 760, followed by a check at 770 to determine if the new point $p_2$ is a solution. If the new point $p_2$ is a solution, that information is returned to the system. If the new point $p_2$ is not a solution, the method returns to 710 and a new test point is randomly selected.

If first test point p is not located in region 1, then at 730 solver 1 is run to identify a new point $p_1$, which is checked to determine at 740 as to whether the new point $p_1$ is a solution. If the new point $p_1$ is a solution, the information is returned to the system If the new point $p_1$ is not a solution, a determination is made at 750 as to whether $p_1$ is in region 3. A point is in region 3 if the penalty function value of the point is greater than the value determined to have a given minimum success probability, which is defined as the probability that the solver can find a solution when starting from that point. If $p_1$ is not in region 3, the method returns to 710 and a new test point is randomly selected. If $p_1$ is in region 3, the method proceeds to 760 and solver 2 is run to find a new point $p_2$.

Figure 8:
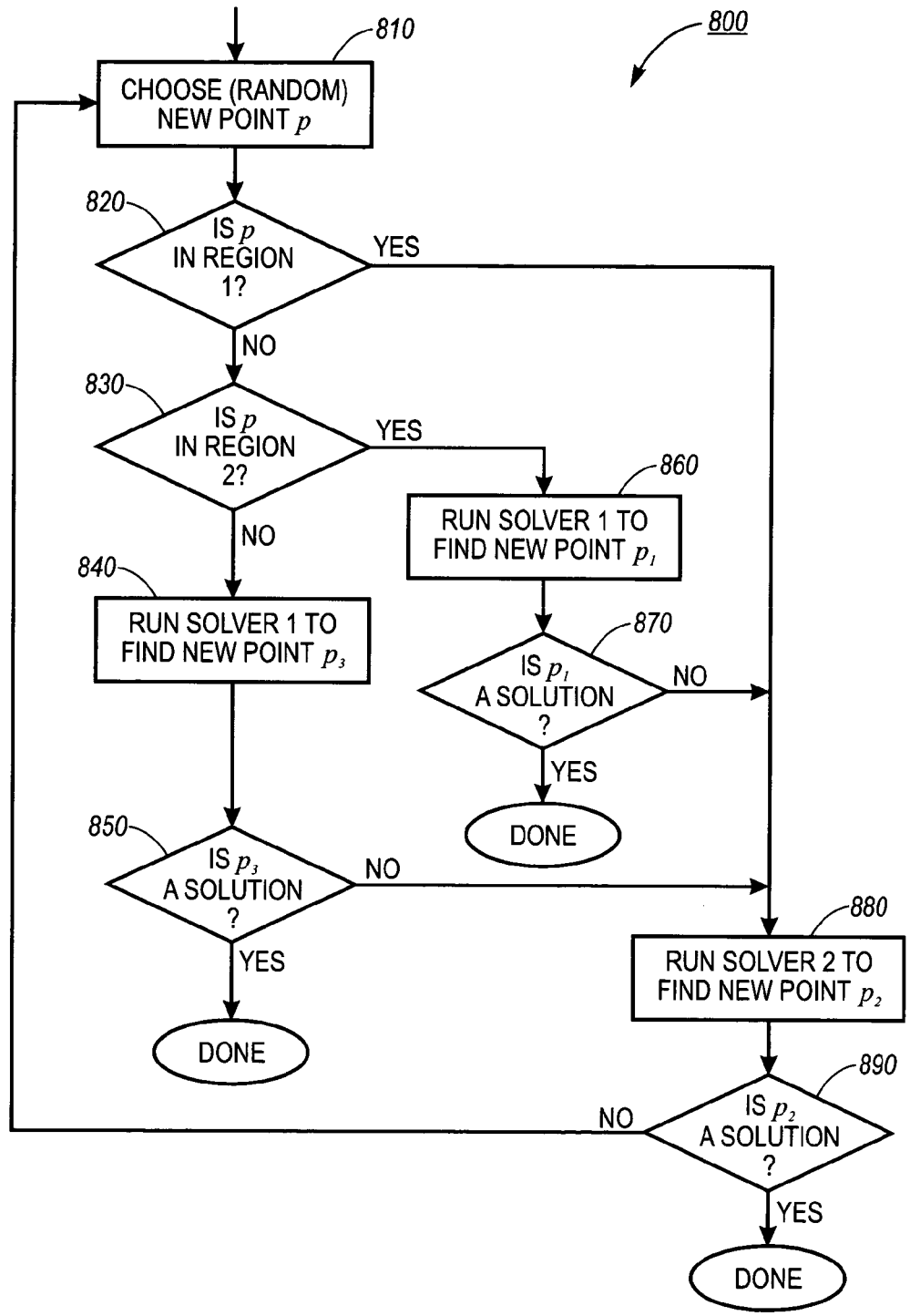
FIG. 8 is a flowchart illustrating a third embodiment of the complexity-directed cooperative solving method, in which the penalty function is not considered.

FIG. 8 illustrates another embodiment 800 of the complexity-directed cooperative problem solving method. For the purposes of example only, in this embodiment solver 1 is a global solver, while solver 2 is a local solver. In this embodiment the penalty function is not considered. A random solution test point p is selected at 810 and a determination is made at 820 as to whether p is in region 1. A point is considered to be in region 1 if the constraint ratio (constraint-to-variable ratio) of the problem is less than the local-global crossover, which is the point at which the cooperative solver returns better performance than an individual solver. If point p is located in region 1, solver 2 is run to find a new point $p_2$ at 880, followed by a check at 890 to determine if the new point $p_2$ is a solution. If the new point $p_2$ is a solution, that information is returned to the system. If the new point $p_2$ is not a solution, the method returns to 810 and a new test point is selected.

If point p is not located in region 1, a determination is made at 830 as to whether point p is in region 2. A point is considered to be in region 2 if the constraint ratio of the problem is less than the global-local phase transition, which is the point at which one of the cooperative solvers transitions from flat performance to an exponential complexity increase. If point p is located in region 2, then at 860 solver 1 is run to find a new point $p_1$, followed by a check at 870 to determine whether new point $p_1$ is a solution. If the new point $p_1$ is a solution, the information is returned to the system; if the new point $p_1$ is not a solution, the system proceeds to 880 and solver 2 is run to find another new point $p_2$. If p is not in region 2, at 840 solver 1 is run to find a new point $p_3$, and at 850 a determination is made as to whether $p_3$ is a solution. If $p_3$ is a solution, the information is returned to the system; if $p_3$ is not a solution, then the method proceeds to 880 and solver 2 is run to find a new point $p_2$.

Those skilled in the art will appreciate that other variations on these embodiments are possible, for example, other parameters, such as the "range" of the global solver and the iteration limits for the global and local solvers based on constraint ratio and/or penalty value, may be adapted. Also, more than two individual solvers may be used, or solvers other than global and local solvers may be combined, if they have similar characteristics that can be used for selection of and switching between solvers. Such alternate approaches are fully contemplated by the specification and scope of the claims herein.

Figure 9:
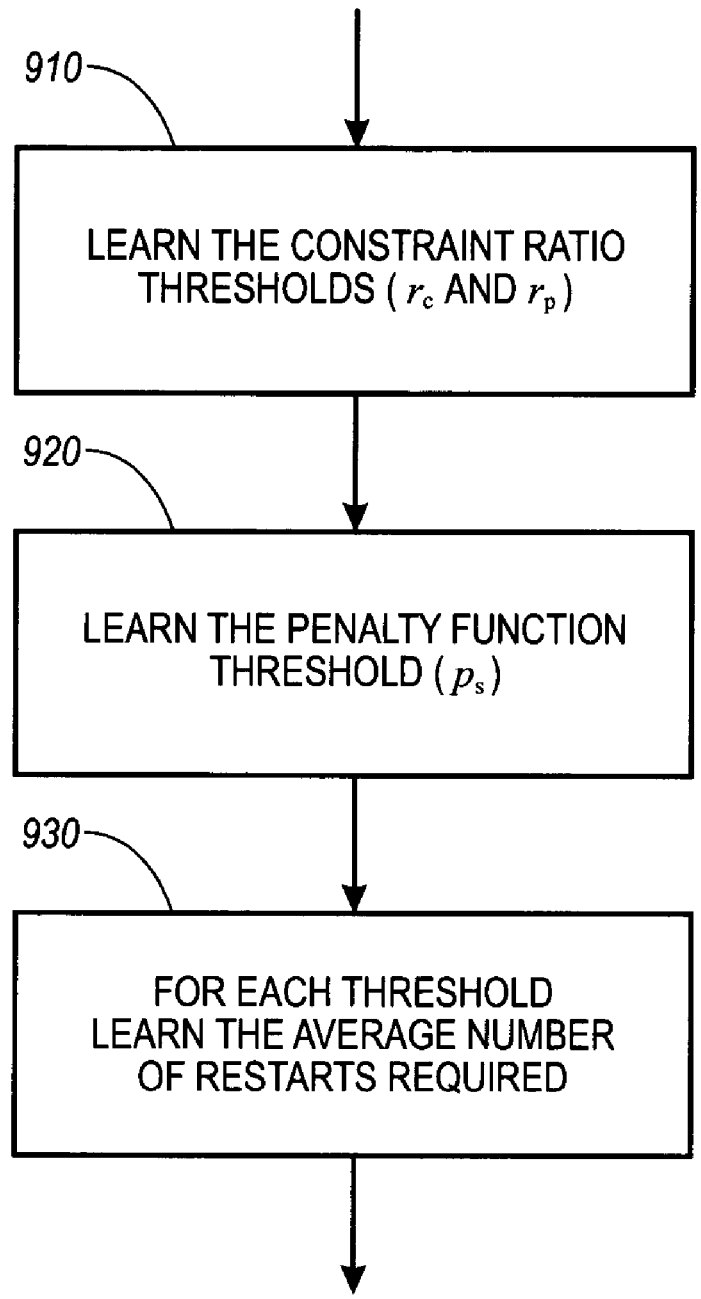
FIG. 9 is a flowchart illustrating a method for learning threshold parameters.

The method for setting the threshold parameters off-line for the region calculation as used hereinabove is described more fully in FIG. 9. Although the approach described in FIG. 9 provides for setting the thresholds off-line automatically through learning from training data, it is appreciated that other methods, such as setting by hand, are also possible. At 910 constraint ratio thresholds ($r_c$ and $r_p$) are learned by comparing solvers in training data, which could include, for example, sample control or diagnostic problems. The penalty function threshold ($p_s$) is learned by tracking the success ratios of local solver runs after global solver runs at 920. At 930 the average number of restarts required for each threshold is learned.

Figure 10:
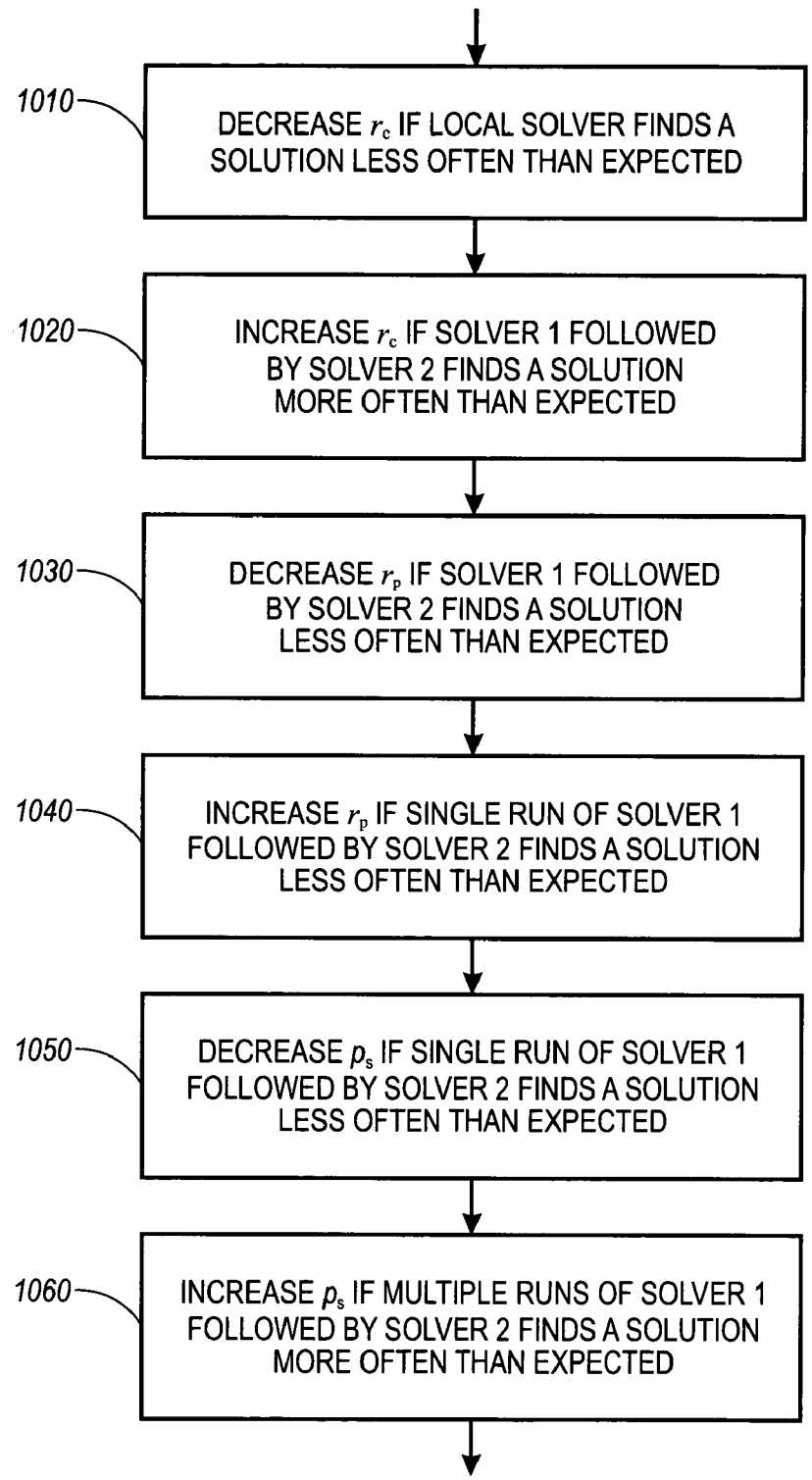
FIG. 10 is a flowchart illustrating a method for setting threshold parameters on-line.

Optionally, the three thresholds may also be set and reset on-line, as shown in FIG. 10, which describes more fully the method for setting the threshold parameters for the region calculation as discussed hereinabove with respect to FIG. 4 at 430. It will be appreciated that other methods and rules are also possible. For the crossover ratio $r_c$, at 1010 $r_c$ is decreased if the local solver finds a solution less often than expected, which would be the case for problems in region 1 near $r_c$. For the purposes of the discussion herein, the phrase "than expected" means as measured by the expected average number of restarts required. At 1020 $r_c$ is increased if the global solver followed by local solver finds a solution more often than expected, as is the case for problems in region 2 near $r_c$. For the phase transition ratio $r_p$, at 1030 $r_p$ is decreased if the global solver followed by the local solver finds a solution less often than expected, as is the case for problems in region 2 near $r_p$. At 1040 $r_p$ is increased if a single run of the global solver followed by a local solver finds a solution less often than expected, which would be the case for problems in region 3 near $r_p$. For success probability $p_s$, at 1050 $p_s$ is decreased if a single run of the global solver followed by local solver finds a solution less often than expected, which is the case for problems in region 3 near $p_s$. At 1060 $p_s$ is increased if multiple runs of the global solver followed by a local solver finds a solution more often than expected, as for problems in region 4 near $p_s$.

The embodiments described herein can also be applied to constrained optimization problems. With the introduction of the objective function, there is a tradeoff between the objective and constraint satisfaction. If constraint satisfaction is treated as the first priority and objective minimization as secondary, then when the time expires, the goal is to obtain a feasible solution. In a cooperative solver, the local solving part will focus on constraint satisfaction, while the global solving part may give more attention to objective minimization and solve the problem in a different space than the local solving part. This is the case in the cooperative solver consisting of an unconstrained and a constrained optimizer. The former typically minimizes a penalty function (amount of constraint violation) that combines the objective and constraint violation. Its solutions likely have higher constraint violations than those found by the constrained optimizer. Thus, when the time bound is tight, the constrained optimizer is selected to obtain a feasible solution first and then improve the objective. Selecting the cooperative solver consisting of the two solvers in this case incurs the danger that the first solver itself may consume the available time and return an infeasible solution. On the other hand, when the time bound is sufficient for the cooperative solver, its solution is likely much better than that found by the second solver alone.

While the present method and system have been illustrated and described with reference to specific embodiments, further modification and improvements will occur to those skilled in the art. For example, other combinations of regions may be utilized that use the same principles as set forth hereinabove. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this method and system are not limited to the particular forms illustrated and that it is intended in the appended claims to embrace all alternatives, modifications, and variations which do not depart from the spirit and scope of this disclosure.

What is claimed:

1. A cooperative solving method for providing resolution of control problems within a computer controlled system having a plurality of subsystems, each having networked sensors and implementation units, with each subsystem having control, monitoring, and fault diagnosis capabilities, wherein the computer controlled system includes an applications module within which reside a control module and a problem solver, wherein the control module receives instructions as to resource constraints and system performance goals and current state data from the implementation units wherein the problem solver utilizes a plurality of solvers to resolve system performance problems, and wherein the control module transmits commands to the subsystem controllers directing operation of the implementation units, the method comprising:

defining a system performance problem to be solved utilizing the plurality of constraint problem solvers, wherein said problem statement includes system performance constraints, current state of the implementation units, service performance goals, a desired solution quality, and a time deadline for solving the said system performance problem;

identifying complexity criteria for each constraint problem solver, wherein said complexity criteria provide direction for selecting a constraint problem solver and for transitioning between constraint problem solvers, wherein each of the constraint problem solvers is parameterized by control parameters in the form of constraints, said control parameters including parameters of each individual solver and the condition for transitioning between different solvers;

starting operation of the cooperative solver by performing random sampling to identify a test point;

determining whether a region 1 complexity criterion has been satisfied, wherein said region 1 criterion comprises the constraint ratio at which the cooperative problem solver performs better than an individual problem solver;

operating a selected first constraint problem solver, if said region 1 criterion has not been satisfied, comprising selecting a first test point, determining whether said first test point is a problem solution, and transmitting said first test point to the system if said first test point is a problem solution;

operating a selected second constraint problem solver, if said first test point is not a problem solution, comprising selecting a second test point, determining whether said second test point is a problem solution, transmitting said second test point to the system if said second test point is a problem solution, and restarting the cooperative problem solver if said second test point is not a problem solution; and operating said selected second constraint problem solver, if said region 1 criterion has been satisfied, comprising selecting a second test point, determining whether said second test point is a problem solution, transmitting said second test point to the control module for formulation of control signals to be transmitted to the subsystem controllers for the implementation units affected if said second test point is a system performance problem solution, and restarting the cooperative problem solver if said second test point is not a system performance problem solution.

2. The cooperative solving method according to claim 1, further comprising:

if said first test point is not a problem solution, determining whether said first test point satisfies a region 3 complexity criterion, wherein said region 3 complexity criterion comprises the probability that the solver can find a solution when starting from said first test point;

operating said selected second constraint problem solver, if said region 3 criterion has been satisfied, comprising selecting a second test point, determining whether said second test point is a problem solution, transmitting said second test point to the system if said second test point is a problem solution, and restarting the cooperative problem solver if said second test point is not a problem solution; and restarting the cooperative problem solver if said region 3 criterion has not been satisfied.

3. The cooperative solving method according to claim 1, further comprising:

determining whether a region 2 complexity criterion has been satisfied if said region 1 complexity criterion has not been satisfied, wherein said region 2 criterion comprises the phase transition ratio at which the cooperative solver transitions from a flat to an exponential complexity increase;

operating a selected first constraint problem solver, if said region 2 criterion has been satisfied, comprising selecting a first test point, determining whether said first test point is a problem solution, and transmitting said first test point to the system if said first test point is a problem solution;

operating a selected first constraint problem solver, if said region 2 criterion has not been satisfied, comprising selecting a third test point, determining whether said third test point is a problem solution, and transmitting said third test point to the system if said third test point is a problem solution; and operating a selected second constraint problem solver, if said first test point or said third test point is not a problem solution, comprising selecting a second test point, determining whether said second test point is a problem solution, transmitting said second test point to the system if said second test point is a problem solution, and restarting the cooperative problem solver if said second test point is not a problem solution.

4. The cooperative solving method according to claim 3, further comprising:

if said third test point is not a problem solution, determining whether said third test point satisfies said region 3 complexity criterion;

operating said selected second constraint problem solver, if said region 3 criterion has been satisfied, comprising selecting a second test point, determining whether said second test point is a problem solution, transmitting said second test point to the system if said second test point is a problem solution, and restarting the cooperative problem solver if said second test point is not a problem solution; and restarting the cooperative problem solver if said region 3 criterion has not been satisfied.

5. The cooperative solving method according to claim 1, further comprising:

determining whether said region 1 or said region 2 complexity criterion has been satisfied;

operating a selected first constraint problem solver, if said region 1 or said region 2 criterion has been satisfied, comprising selecting a first test point, determining whether said first test point is a problem solution, and transmitting said first test point to the system if said first test point is a problem solution;

operating a selected first constraint problem solver, if said region 1 or said region 2 criterion has not been satisfied, comprising selecting a third test point, determining whether said third test point is a problem solution, and transmitting said third test point to the system if said third test point is a problem solution;

if said third test point is not a problem solution, determining whether said third test point satisfies said region 3 complexity criterion;

operating said selected second constraint problem solver, if said region 3 criterion has been satisfied or if said first test point is not a problem solution, comprising selecting a second test point, determining whether said second test point is a problem solution, transmitting said second test point to the system if said second test point is a problem solution, and restarting the cooperative problem solver if said second test point is not a problem solution; and restarting the cooperative problem solver if said region 3 criterion has not been satisfied.

6. The cooperative solving method according to claim 1, wherein said selected first constraint problem solver comprises a global solver.

7. The cooperative solving method according to claim 1, wherein said selected second constraint problem solver comprises a local solver.

8. The cooperative solving method according to claim 1, further comprising:
 recording solution frequency data for solver 1;
 recording solution frequency data for solver 2; and
 setting threshold parameters for region calculation.

9. The cooperative solving method according to claim 8, further comprising setting said threshold parameters for region calculation off-line.

10. The cooperative solving method according to claim 9, further comprising:
 learning said constraint ratio thresholds by comparing solvers in training data;
 learning said penalty function threshold by recording the success ratios of solver 2 operation after solver 1 operation; and
 learning the average number of restarts required for each threshold.

11. The cooperative solving method according to claim 8, further comprising setting said threshold parameters for region calculation on-line.

12. The cooperative solving method according to claim 11, further comprising:
 decreasing the crossover ratio if a local solver finds a solution less often than expected;
 increasing the crossover ratio if a global solver followed by a local solver finds a solution more often than expected;
 decreasing the phase transition ratio if a global solver followed by a local solver finds a solution less often than expected;
 increasing the phase transition ratio if a global solver followed by a local solver finds a solution less often than expected;
 decreasing the penalty function threshold if a single run of a global solver followed by a local solver finds a solution less often than expected; and
 increasing the penalty function threshold if multiple runs of a global solver followed by a local solver finds a solution more often than expected.

13. The cooperative solving method according to claim 1, wherein said parameters comprise the range of the global solver.

14. The cooperative solving method according to claim 1, wherein said parameters comprise the iteration limits for the global and local solvers based on constraint ratio.

15. The cooperative solving method according to claim 1, wherein said parameters comprise the iteration limits for the global and local solvers based on penalty value.

16. The cooperative solving method according to claim 1, further comprising a time deadline by which a solution is to be produced.

17. A computerized cooperative problem solving system for providing resolution of control problems within a computer controlled system having a plurality of subsystems, each having networked sensors and implementation units, with each subsystem having control, monitoring, and fault diagnosis capabilities, wherein the computer controlled system includes an applications module within which reside a control module and a problem solver, wherein the control module receives instructions as to resource constraints and system performance goals and current state data from the implementation units, wherein the problem solver utilizes a plurality of solvers to resolve system performance problems, and wherein the control module transmits commands to the subsystem controllers directing operation of the implementation units, the cooperative solving system comprising:
 means for defining a system performance problem to be solved utilizing the plurality of constraint problem solvers, wherein said problem statement includes system performance constraints, current state of the implementation units, system performance goals, a desired solution quality, and a time deadline for solving the said a system performance problem;
 means for identifying complexity criteria for each constraint problem solver, wherein said complexity criteria provide direction for selecting a constraint problem solver and for transitioning between constraint problem solvers, wherein each of the constraint problem solvers is parameterized by control parameters in the form of constraints, said control parameters including parameters of each individual solver and the condition for transitioning between different solvers;
 means for starting operation of the cooperative solver by performing random sampling to identify a test point;
 means for determining whether a region 1 complexity criterion has been satisfied, wherein said region 1 criterion comprises the constraint ratio at which the cooperative problem solver performs better than an individual problem solver;
 means for operating a selected first constraint problem solver, if said region 1 criterion has not been satisfied, comprising selecting a first test point, determining whether said first test point is a problem solution, and transmitting said first test point to the system if said first test point is a problem solution;
 means for operating a selected second constraint problem solver, if said first test point is not a problem solution, comprising selecting a second test point, determining whether said second test point is a problem solution, transmitting said second test point to the system if said second test point is a problem solution, and restarting the cooperative problem solver if said second test point is not a problem solution; and
 means for operating said selected second constraint problem solver, if said region 1 criterion has been satisfied, comprising selecting a second test point, determining whether said second test point is a problem solution, transmitting said second test point to the control module for formulation of control signals to be transmitted to the subsystem controllers for the implementation units affected if said second test point is a system performance problem solution, and restarting the cooperative problem solver if said second test point is not a system performance problem solution.

18. The cooperative solving system according to claim 17, further comprising:
 means for determining whether said first test point satisfies a region 3 complexity criterion, if said first test point is not a problem solution, wherein said region 3 complexity criterion comprises the probability that the solver can find a solution when starting from said first test point;

means for operating said selected second constraint problem solver, if said region 3 criterion has been satisfied, comprising selecting a second test point, determining whether said second test point is a problem solution, transmitting said second test point to the system if said second test point is a problem solution, and restarting the cooperative problem solver if said second test point is not a problem solution; and means for restarting the cooperative problem solver if said region 3 criterion has not been satisfied.

19. The cooperative solving system according to claim 17, further comprising:

means for determining whether a region 2 complexity criterion has been satisfied if said region 1 complexity criterion has not been satisfied, wherein said region 2 criterion comprises the phase transition ratio at which the cooperative solver transitions from a flat to an exponential complexity increase;

means for operating a selected first constraint problem solver, if said region 2 criterion has been satisfied, comprising selecting a first test point, determining whether said first test point is a problem solution, and transmitting said first test point to the system if said first test point is a problem solution;

means for operating a selected first constraint problem solver, if said region 2 criterion has not been satisfied, comprising selecting a third test point, determining whether said third test point is a problem solution, and transmitting said third test point to the system if said third test point is a problem solution; and means for operating a selected second constraint problem solver, if said first test point or said third test point is not a problem solution, comprising selecting a second test point, determining whether said second test point is a problem solution, transmitting said second test point to the system if said second test point is a problem solution, and restarting the cooperative problem solver if said second test point is not a problem solution.

20. The cooperative solving system according to claim 19, further comprising:

means for determining whether said third test point satisfies said region 3 complexity criterion, if said third test point is not a problem solution;

means for operating said selected second constraint problem solver, if said region 3 criterion has been satisfied, comprising selecting a second test point, determining whether said second test point is a problem solution, transmitting said second test point to the system if said second test point is a problem solution, and restarting the cooperative problem solver if said second test point is not a problem solution; and means for restarting the cooperative problem solver if said region 3 criterion has not been satisfied.

21. The cooperative solving system according to claim 17, further comprising:

means for determining whether said region 1 or said region 2 complexity criterion has been satisfied;

means for operating a selected first constraint problem solver, if said region 1 or said region 2 criterion has been satisfied, comprising selecting a first test point, determining whether said first test point is a problem solution, and transmitting said first test point to the system if said first test point is a problem solution;

means for operating a selected first constraint problem solver, if said region 1 or said region 2 criterion has not been satisfied, comprising selecting a third test point, determining whether said third test point is a problem solution, and transmitting said third test point to the system if said third test point is a problem solution;

means for determining whether said third test point satisfies said region 3 complexity criterion, if said third test point is not a problem solution;

means for operating said selected second constraint problem solver, if said region 3 criterion has been satisfied or if said first test point is not a problem solution, comprising selecting a second test point, determining whether said second test point is a problem solution, transmitting said second test point to the system if said second test point is a problem solution and restarting the cooperative problem solver if said second test point is not a problem solution; and means for restarting the cooperative problem solver if said region 3 criterion has not been satisfied.

22. The cooperative solving system according to claim 17, wherein said selected first constraint problem solver comprises a global solver.

23. The cooperative solving system according to claim 17, wherein said selected second constraint problem solver comprises a local solver.

24. The cooperative solving system according to claim 17, further comprising:

means for recording solution frequency data for solver 1;

means for recording solution frequency data for solver 2; and means for setting threshold parameters for region calculation.

25. The cooperative solving system according to claim 24, further comprising setting said threshold parameters for region calculation off-line.

26. The cooperative solving system according to claim 25, further comprising:

means for learning said constraint ratio thresholds by comparing solvers in training data;

means for learning said penalty function threshold by recording the success ratios of solver 2 operation after solver 1 operation; and means for learning the average number of restarts required for each threshold.

27. The cooperative solving system according to claim 24, further comprising setting said threshold parameters for region calculation on-line.

28. The cooperative solving system according to claim 27, further comprising:

means for decreasing the crossover ratio if a local solver finds a solution less often than expected;

means for increasing the crossover ratio if a global solver followed by a local solver finds a solution more often than expected;

means for decreasing the phase transition ratio if a global solver followed by a local solver finds a solution less often than expected;

means for increasing the phase transition ratio if a global solver followed by a local solver finds a solution less often than expected;

means for decreasing the penalty function threshold if a single run of a global solver followed by a local solver finds a solution less often than expected; and means for increasing the penalty function threshold if multiple runs of a global solver followed by a local solver finds a solution more often than expected.

29. The cooperative solving system according to claim 17, further comprising a deadline by which a solution is to be produced.

30. An article of manufacture comprising a computer usable medium having computer readable program code embodied in said medium which, when said program code is executed by said computer causes said computer to perform method steps for providing resolution of control problems within a computer controlled system having a plurality a subsystems, each having networked sensors and implementation units with each subsystem having control monitoring and fault diagnosis capabilities, wherein the computer controlled system includes an applications module within which reside a control module and a problem solver, wherein the control module receives instructions as to resource constraints and system performance goals and current state data from the implementation units, wherein the problem solver utilizes a plurality of solvers to resolve system performance problems, and wherein the control module transmits commands to the subsystem controllers directing operation of the implementation units, the method comprising:

defining a system performance problem to be solved utilizing the plurality of constraint problem solvers wherein said problem statement includes system performance constraints, current state of the implementation units, system performance goals, a desired solution quality, and a time deadline for solving the said system performance problem;

identifying complexity criteria for each constraint problem solver, wherein said complexity criteria provide direction for selecting a constraint problem solver and for transitioning between constraint problem solvers, wherein each of the constraint problem solvers is parameterized by control parameters in the form of constraints, said control parameters including parameters of each individual solver and the condition for transitioning between different solvers;

starting operation of the cooperative solver by performing random sampling to identify a test point;

determining whether a region 1 complexity criterion has been satisfied, wherein said region 1 criterion comprises the constraint ratio at which the cooperative problem solver performs better than an individual problem solver;

operating a selected first constraint problem solver, if said region 1 criterion has not been satisfied, comprising selecting a first test point, determining whether said first test point is a problem solution, and transmitting said first test point to the system if said first test point is a problem solution;

operating a selected second containing problem solver, if said first test point is not a problem solution, comprising selecting a second test point, determining whether said second test point is a problem solution, transmitting said second test point to the system if said second test point is a problem solution, and restarting the cooperative problem solver if said second test point is not a problem solution; and operating said selected second constraint problem solver, if said region 1 criterion has been satisfied, comprising selecting a second test point, determining whether said second test point is a problem solution, transmitting said second test point to the control module for formulation of control signals to be transmitted to the subsystem controllers for the implementation units affected if said second test point is a system performance problem solution, and restarting the cooperative problem solver if said second test point is not a system performance problem solution.

* * * * *